United States Patent Office 3,008,447
Patented Nov. 14, 1961

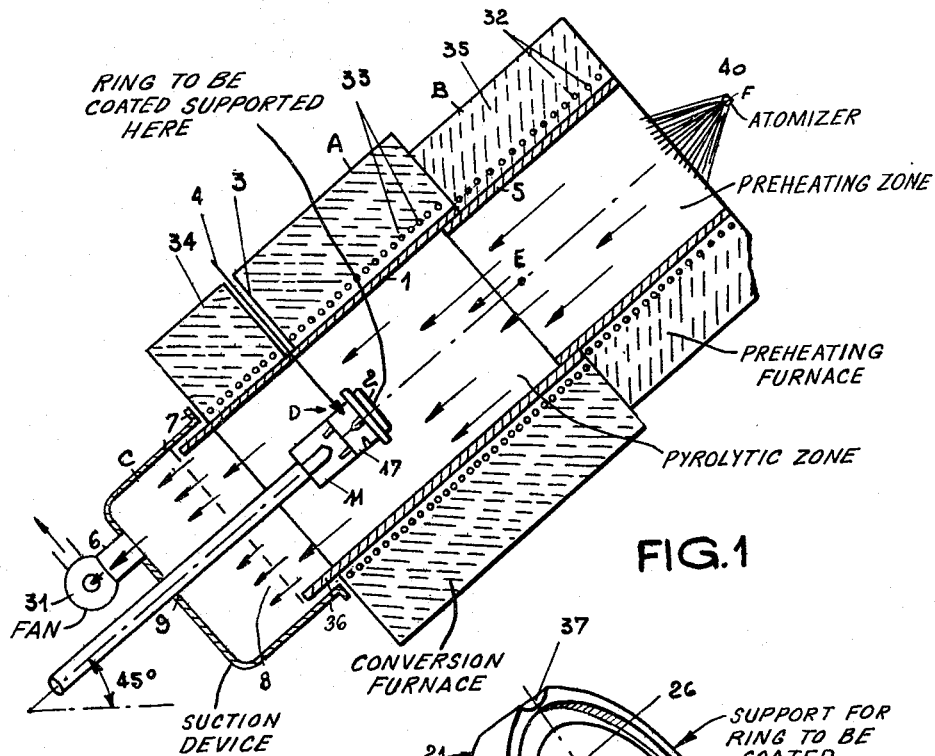
FIG. 1
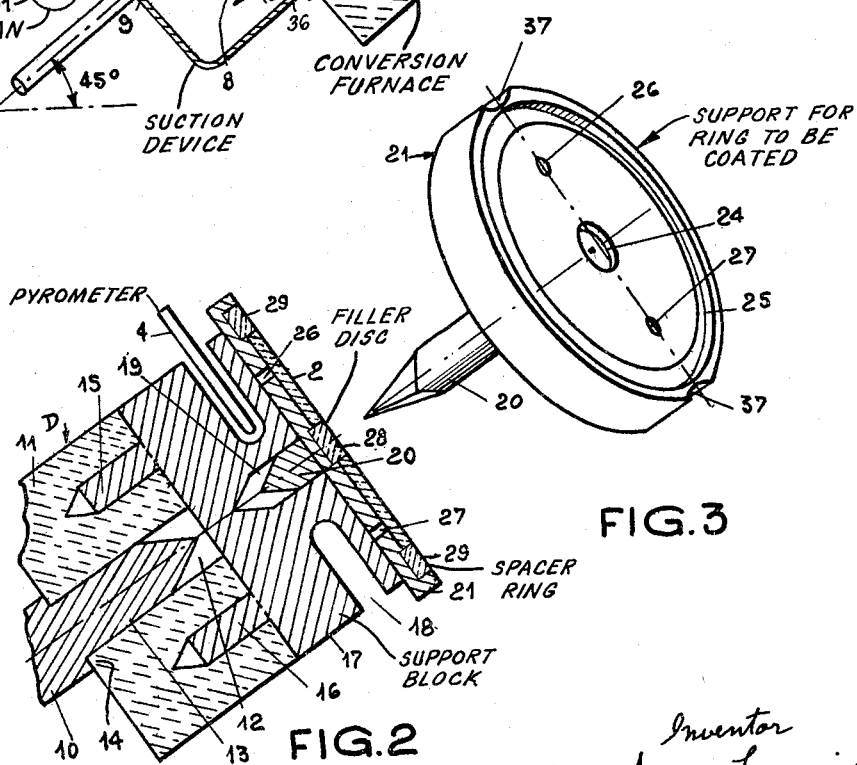
FIG. 2
FIG. 3

3,008,447
APPARATUS FOR THE PRODUCTION OF ELECTRICALLY CONDUCTIVE FILM LAYERS OF CONTROLLED RESISTIVITY
Serge Lacroix, Paris, France, assignor to Societe d'Electronique et d'Automatisme, Courbevoie, France
Filed Nov. 13, 1959, Ser. No. 852,742
Claims priority, application France Nov. 15, 1958
7 Claims. (Cl. 118—58)

The present invention relates to apparatus for the production of electrically conductive film layers of controlled resistivity by depositing metal oxides and (or) nitride complexes in a special way on the surface of a dielectric non-porous material, such as a glass of high melting point and low coefficient of thermal expansion.

The object of these improvements is to obtain film layers of the indicated type which are particularly adapted to be used, as tracks, in electric potentiometers of the type disclosed in French Patent 1,142,646 of February 11, 1956, while employing, however, a process of producing these layers which is appreciably simpler than that described in the patent.

In order to produce electrically resistant films of the subject type, numerous possible compositions are known, principally containing tin, idium or titanium, to which various trace ingredients are added in order to make their oxides or nitrides electrically conductive. Also, several general methods have been contemplated for producing layers of these compositions. These include evaporation of the component chemical elements in an oxidizing or nitriding atmosphere and pyrolytic conversion of vapors of suitable salts in contact with a heated surface. This last method can be operated either in the vapor phase or in the liquid phase, in which case the salts are first placed in solution and this solution then sprayed onto the heated surface. The spraying method seems to lead to the best quality of intimate attachment of the film to its support and is of interest in view of the simplicity of the apparatus for carrying it out. However, the direct spraying of the solution without other conditioning onto a heated plate by prior known methods in order to produce heating elements for toasters, windshield defrosters and the like, has been found unsuitable for the production of films of high electric quality intended to be used in the formation of potentiometer tracks. This is due mainly to the fact that the homogeneity of the deposits so made is unsatisfactory since numerous heterogenities appear in the film formed in this way. Thus, it has been found that even after application of treatments for adjusting the electric characteristics of the films for the formation of potentiometer tracks, some of the tracks had to be rejected at the time of the formation itself because certain heterogeneities prevented normal cutting out of the film by giving local radial variations of excessively large amount. Some also had to be rejected subsequently because of removal by the potentiometer wiper of "hills" of such heterogeneities of deposit.

A principal object of the present invention is the provision of new improvements in the production of electrically conductive films of metal oxides or nitrides to give layers of controlled and uniform resistivity. Another object is the elimination of defects and problems associated with prior known methods of producing electrically conductive layers by a spraying technique. A further object is the provision of new, unique apparatus for carrying out the production of electrically conductive films as contemplated by the invention. A still further object is the provision of new, improved electrically conductive films of controlled and uniform resistivity by a spraying method.

These objects are accomplished according to the present invention by providing a solution of a metal salt, in a volatile solvent, dispersing the solution into small droplets, directing the solution droplets along a heating path, causing the droplets to travel along said path in streamline flow, i.e., without turbulence, said path being divided into at least two sections, the first section being at a temperature lower than the second section, but at least as high as 100° C. and the second section being at a temperature sufficiently high pyrolytically to convert the metal salt into an oxide or nitride, preferably between about 600 and 650° C. In the second section of said heating path, there is positioned a support element upon which the electrically conductive film is to be formed and this support is slowly rotated while heated particles formed from the droplets impinge on the support as a result of streamline flow of fluid and particles along the heating path. The velocity of said streamline flow is coordinated with the heating temperature and length of heating path so that the solution droplets have their average diameter gradually reduced in the first section of the heating path by evaporation of the volatile components of the droplets and then the resulting solid particles are heated in the second section to the optimum pyrolytic conversion temperature.

In the preferred form of the invention, ammonia gas, steam or other reactive gas is introduced into the streamline flow of materials at a point corresponding to the end of the first section of the heating path to effect a partial transformation of the metal salt in the fluid borne particles to oxide or nitride and then the pyrolytic conversion of the sprayed particles is completed on the surface of the receiving support, whereby a film of improved areal uniformity, both as to thickness and electrical properties, is formed and is tenaciously attached to the supporting surface.

As stated, the invention relates particularly to the production of films intended for the use as potentiometer tracks, and for this, the support will be a ceramic in the form of a ring. In order to insure that the deposit will have the same thickness and the same homogeneity of electric properties toward the outer and inner edges of the ring, the invention subsidiarily contemplates an arrangement for the support of the ring consisting of two flush parts, namely a central disc and a peripheral part, which function in a fashion to be described more fully below in conjunction with the accompanying drawings, in which:

FIG. 1 shows an elevation, partially in section, of the apparatus used in the present invention;

FIG. 2 is an enlarged longitudinal section of the turning head of said apparatus;

FIG. 3 shows, in isometric projection, an enlarged view of the support head shown in FIG. 2;

Figure 4:
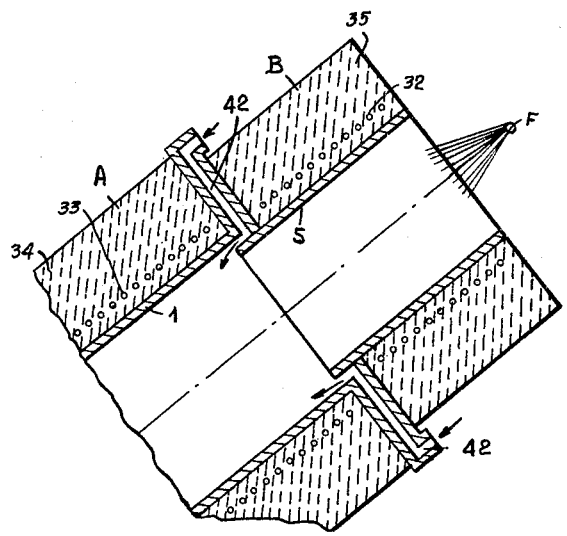
FIG. 4 is a partial view in sectional elevation of a modification of the apparatus of FIG. 1.

The apparatus shown comprises: a pyrolytic conversion furnace A, a preheating furnace B, a suction device C, a film support turning head D, and an atomizer F for the introduction of the solution into the inlet of the preheating furnace B. For optimum results, the atomizer F should not be too far from the opening of the said furnace B and should not give too great a spread to the droplets which it emits. For a depth of the heating path of the order of 80 cm. between the opening of the furncae B and the film receiving support, for instance, the atomizer will be arranged about 15 cm. from the opening of the furnace B and its jet will not exceed a cone angle of 45 degrees, the opening of the furnace B not exceeding a diameter of about 30 cm. in such a case. The atomizer is preferably of a type capable of forming a fog of fine droplets of the solution of uniform spatial density.

The pyrolytic conversion furnace A is a resistance furnace with, for instance, a nickel-chrome-wound resistor 33, and this furnace is carefully heat insulated with insulation 34. The inside of the furnace is formed of a refractory tube 1 which at the rear end extends at 36 and penetrates into the part C of the apparatus to a chamber of said part C defined by a perforated wall or grid 8.

By way of illustration, the depth of this furnace is about 70 cm. and its diameter about 35 to 40 cm., the extension 36 of the refractory cylinder 1 into the part C being of the order of 8 to 10 cm.

The electric power of this conversion furnace A is calculated so that under conditions of steady operation, the temperature measured by a pyrometer 4 (passing through a conduit 3 provided for this purpose in the furnace) near the pyrolysis deposit receiving support is of the order of 600° to 650° C. for the preferred coating compositions, although this may be varied to accommodate the pyrolytic conversion temperature of the specific metal salts employed in the coating. The automatic regulation of this furnace (not shown) assures a steadiness of this temperature within at least ±15° C.

The preheating furnace B also has a wound resistor 32 and heat insulation 35. The inside of this furnace consists of a refractory tube 5 extending out a few centimeters at its rear end for the thermal connection between the two furnaces. The heating is regulated automatically so that at point E the internal temperature reaches at least 100° C., e.g., 100° to 200° C. By way of illustration, the depth of this furnace is of the order of 35 cm.

The suction device C comprises a hood or covering 7 of a non-oxidizable material which is connected to the rear of the furnace A and a suction conduit 6 through which a fan 31 creates a constant vacuum in the furnace during the operation. A perforated wall 8 is provided in this covering so as to make the flow in furnace A regular and streamline (and therefore also in the furnace B after the spray introduction zone).

The end of the covering 7 is perforated at 9 for the passage of a shaft 10 which is continuously rotated by motor means (not shown) during a film-forming operation. This rotation may, for instance, be of about one to ten revolutions per minute.

By way of illustration, for a spraying of 2 to 10 cubic centimeters of solution per minute, the suction may be established between 20 and 60 liters per minute. The perforations in plate 8 can be between 0.5 to 1 cm. in area. Such construction results in complete streamline flow of fluids through the heating path defined by tubes 1 and 5 with a velocity about 30 to 85 cm. per minute. Actually, satisfactory films may be formed with streamline flow velocities of a wider range, e.g., 20 to 200 cm. per minute. The excess of particles and gas not contacting the element D pass out the apparatus via the suction means C.

The shaft 10 at its end bears the film-support head D. This shaft has its end 13 engaged in a central conduit of a part 11 of steatite or the like abutting against the shoulder 14 of the shaft 10. On this refractory part 11, the main purpose of which is to avoid excessive heating of the end of shaft 10, there is fastened by studs such as 15 and 16, a metal block 17 which serves as heating mass for the film support. This block 17 is provided with an annular groove 18 in which there is housed the end of the pyrometer 4, so that the temperature of the block 17 may be accurately determined during an operating pass. It is this temperature which preferably is about 600 to 650° C.

Figure 5:
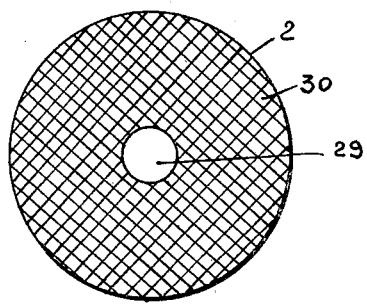
FIG. 5 is a front view of the product obtained by the carrying out of the invention.

The block 17 is provided with an axial recess of triangular cross-section, 19, into which there is fitted the tail 20, also of triangular cross-section, of the metal part 21. Alternative forms of holding means can be employed, e.g., permanent magnet arrangements, etc., if desired. The part 21 is a short cylinder, for instance, stainless steel plate, having at 37 two diametrically opposite depressions for its manipulation, as will be explained below. It may, by way of illustration, have a thickness of about 4 mm. Its front face has two depressions, the central one, 24, forming a housing to maintain a polished ceramic disk 28, and the other depression 25 of ring form, forming a housing to maintain a ceramic ring 29 also polished. The disk 28 and the ring 29 are of the same material and the same surface condition as the polished ceramic ring 2 which is deposited between them and which will constitute the useful receiving support of the final film. The front surfaces of these three parts, the central part being maintained by the two others, are flush and together form a receiving face for the pyrolytic conversion product. This arrangement avoids the edge irregularities of the deposit obtained by pyrolysis on the useful portion of the film, these defects being noted on the parts which surround it. There will thus be obtained (see FIG. 5) a ring 2 bearing a film 30 of the same thickness over its entire width. The central cut-out 29 of this ring 2 is of approximately the same diameter as the disk 28 and its outside diameter is equal to the inside diameter of the depression 25. The thickness of the ring 2 is equal to the difference between the thickness of one of the parts which surround it and the depth of the corresponding depressions 25 or 24 of block 21.

In this cylinder 21, there are furthermore indicated two perforations 26 and 27 intended to facilitate the withdrawal of the part 2 after the formation of the film by simply pushing through them a rod, which is a simple tool and not shown.

In order to produce potentiometer tracks of different inside and outside diameters with the apparatus described, the operator has several parts 21, the depressions 24 and 25 of which are calibrated in accordance with the dimensions of the tracks to be made and, of course, corresponding sets of auxiliary parts to be put in place in these depressions.

For the use of the apparatus of FIG. 1, it is advantageous that the inclination of the longitudinal axis of the structure be 45° to the horizontal. A horizontal position of the axis is poor for the proper travel of the mist, while a vertical position is poor because there is the risk of applying spray jets directly on the exposed face to be covered by the desired film layer. However, the inclination may be varied, e.g., between 30° and 60°.

It is also advantageous for this operation that the operator have a number of parts 21 such as shown in FIG. 3, which he can stock in advance and place, for preheating, in an ordinary furnace which can contain them and the inside temperature of which is for instance, 600° C. The introduction of the parts and their removal from this furnace, and the placing of them as required on the head D, and their removal after formation of the film is effected by manipulation of the parts by means of tongs which grasp the parts via notches 37.

To summarize the method of operation, it may be stated that the operator places the two heating furnaces A and B, as well as the suction fan, in operation until the measurement equipment indicates the desired temperatures at point E of furnace B and in head D of furnace A. The head D is naturally in continuous rotation. He then removes from the auxiliary furnace one of the parts which has been prepared and puts it on the head D, temporarily stopping the rotation of the shaft 10 for this operation. In a few minutes, the support part 2 and ring 29 will have assumed the same temperature as the mass 17. The operator then places the atomizer in operation and observes the color of the light reflected from the film deposit during its formation. This color is a function of the thickness of the film formed and this thickness determines the resistance per square unit area of film formed.

The following table gives the film thickness corresponding to the indicated color:

TABLE I

| Thickness in millimicrons | Color |
| --- | --- |
| 10 | white. |
| 40 | brownish white. |
| 55 | yellow brown. |
| 60 | brown. |
| 65 | bright red. |
| 70 | dark violet. |
| 76.5 | purplish blue. |
| 83 | blue. |
| 108 | gray blue. |
| 126 | bluish green. |
| 138 | yellowish green. |
| 141 | bright green. |
| 144 | greenish yellow. |
| 166 | orange. |
| 187 | bright crimson. |
| 206 | purple. |
| 216 | violet. |
| 227 | purplish blue. |
| 237 | dark blue. |
| 252 | green. |
| 282 | yellowish green. |
| 287 | dull yellow. |
| 333 | brownish red. |
| 357 | grayish blue. |
| 383 | blue green. |
| 414 | yellowish green. |

When the operator sees the desired color, he stops the atomizing, then the shaft 10, removes the part 21 from head D and places it in a zone which is sheltered from dust, where it is allowed slowly to cool. He then removes another part from the auxiliary furnace and again starts the same operations, and so on.

The new coating procedures and apparatus as described herein are generally applicable for use with all metal containing compositions comprising trace ingredients known to be capable of pyrolytic conversion under suitable conditions to give oxide or nitride films which are electrically conductive. Specific compositions of this type which have been found to be particularly suitable for use in the new coating procedures are described in the following examples in which all parts are by weight unless otherwise specified:

*Example 1*

| | Parts |
| --- | --- |
| Stannous chloride | 400 |
| Antimony trichloride | 4 |
| Ferric chloride | 8 |
| Bismuth trichloride | 0.4 |
| Ethyl alcohol | 790 |

*Example 2*

| | Parts |
| --- | --- |
| Stannous chloride | 400 |
| Antimony trichloride | 8 |
| Ferric chloride | 8 |
| Bismuth trichloride | 0.8 |
| Ethyl alcohol | 790 |

*Example 3*

| | Parts |
| --- | --- |
| Stannous chloride | 400 |
| Antimony trichloride | 2 |
| Ferric chloride | 8 |
| Bismuth trichloride | 0.8 |
| Ethyl alcohol | 790 |

*Example 4*

| | Parts |
| --- | --- |
| Stannous chloride | 400 |
| Antimony trichloride | 1 |
| Ferric chloride | 8 |
| Bismuth trichloride | 1.2 |
| Ethyl alcohol | 790 |

Other usable compositions based upon indium or titanium salts as the major component and niobium, vanadium, zinc, tungsten, copper, boron, chromium, manganese, cobalt, and nickel as the trace elements are known and may be used. A more extensive discussion of the compositions is given in copending application of J. M. N. Hanlet, S.N. 636,410, filed January 25, 1957.

When the metal salt solutions as above indicated are applied in the fashion herein described, electrically conductive films of relative high uniformity of thickness and electrical conductivity are obtained. These films are composed of metal complexes comprising invariably some metal oxide with or without metal nitride and they may be broadly referred to as metal oxide comprising films.

As has been stated, it may be useful during the formation of a film to effect the introduction into the fog either of an excess of steam or of a nitriding vapor or both of these vapors, one after the other. They may be sprayed into the opening of the furnace B, in the form of an auxiliary spray of water and/or nitriding liquid, but it has been found more advantageous to effect the injection of them between the furnaces B and A (see FIG. 4). There is then established between the refractory tubes 1 and 5 an annular space which can be fed by radial conduits such as 42 between the heat insulated linings of these furnaces, or in one of these linings so as to force preheated vapors of water and/or nitriding substances to enter the furnace A with a peripheral distribution which is as uniform as possible.

Other variants in detail besides those which have been described may be contemplated without thereby going beyond the scope of the invention as defined in the following claims.

I claim:

1. Apparatus for use in the production of members comprising a supporting base element and an electrically conductive metal oxide comprising film having a high degree of uniformity in thickness and electrical properties across the film area which comprises a tubular chamber divided into at least two sections, means to heat said chamber, with the section thereof adjacent the inlet end of the chamber being maintained at a temperature above 100° C. and appreciably less than the temperature of the section adjacent the outlet end of the chamber, suction means positioned on the outlet end of said chamber capable of withdrawing fluid from said chamber uniformly across the entire cross-section thereof to thereby continuously maintain streamline fluid flow through said chamber, rotatable means positioned within said outlet end section of said chamber for rotatably holding a film supporting base element within said outlet end section; means for determining the temperatures prevailing within said chamber sections, and means to produce an atomized fog from a liquid solution at the inlet end of said chamber.

2. Apparatus as claimed in claim 1 wherein said chamber comprises a pair of heat resistant tubes, the tube constituting the inlet end of the chamber being telescoped into the tube constituting the outlet end of the chamber and said means to heat the chamber comprises electrical resistant elements surrounding said tubes and encased by heat insulation.

3. Apparatus as claimed in claim 2 wherein there is conduit means connected to the junction defined by the overlap of said inlet end tube and said outlet end tube, whereby gas may be introduced axially into said chamber.

4. Apparatus as claimed in claim 1 wherein said rotatable holding means comprises a plate positioned with its front surface facing the inlet of said chamber and normal to the longitudinal axis of the chamber, said plate having a peripheral ring-shaped depression and a central disc-shaped depression in its front surface and a ceramic ring which snugly fits into said ring-shaped depression and a ceramic disc which snugly fits into said disc-shaped depression forming therebetween a ring-shaped cavity in which to support a ring-shaped film supporting element.

5. Apparatus as claimed in claim 4 wherein said rotatable holding means comprises a metal block rotatably held within said chamber by driven rotation means, said block having a circular slot extending radially in from the side of the block normal to the axis of rotation thereof.

6. Apparatus as claimed in claim 1 wherein said suction means comprises a hood enclosing the open outlet end of said chamber, a suction fan connected to said hood to withdraw fluid from the hood and baffle means positioned across the hood, normal to the longitudinal axis of said chamber, between said fan and said outlet end.

7. Apparatus as claimed in claim 2 wherein the electrical resistant heating element surrounding the inlet tube of the chamber is separate from the electrical resistant heating element surrounding the other tube of the chamber and said separate heating elements are provided with separate means to control the temperature of the interior of the respective tubes.

References Cited in the file of this patent

UNITED STATES PATENTS

| | | |
|---|---|---|
| 2,026,086 | Farncomb | Dec. 31, 1935 |
| 2,065,218 | Garesche | Dec. 22, 1936 |
| 2,260,471 | McLeod | Oct. 28, 1941 |
| 2,564,709 | Moschel | Aug. 21, 1951 |
| 2,694,761 | Tarnopol | Nov. 16, 1954 |